UNITED STATES PATENT OFFICE.

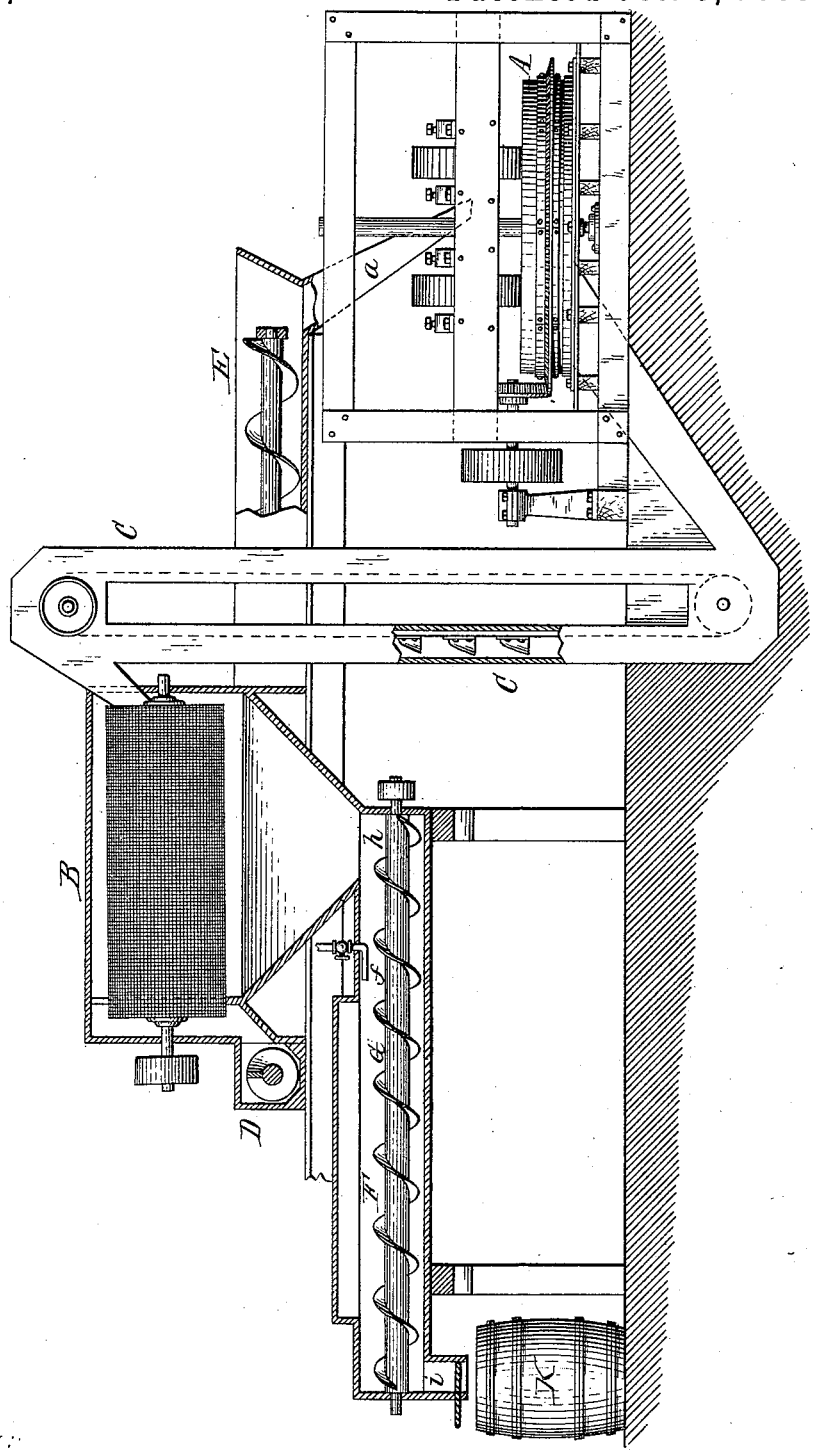

URIAH CUMMINGS, OF BUFFALO, NEW YORK.

HYDRAULIC CEMENT.

SPECIFICATION forming part of Letters Patent No. 350,415, dated October 5, 1886.

Application filed July 3, 1885. Serial No. 170,630. (No model.)

*To all whom it may concern:*

Be it known that I, URIAH CUMMINGS, of the city of Buffalo, in the county of Erie and State of New York, have invented new and useful Improvements in the Manufacture of Hydraulic Lime and Cement, of which the following is a specification.

In preparing hydraulic lime and cement for the market it is necessary to properly hydrate the free lime contained therein in order to prevent such lime from gradually absorbing moisture after the lime or cement is used, thereby expanding the masonry, and weakening the bond and impairing the strength of the mortar.

It is customary in the manufacture of the higher grades of hydraulic cement to expose the ground product of the kiln in a thin layer to the atmosphere, and turn the material from time to time by means of shovels in order to permit the free lime to absorb the requisite quantity of moisture from the atmosphere. This process consumes from four to six weeks, according to the state of the weather and the condition of the calcined product, and requires a large area or floor-space for spreading the material. It has also been customary to spread the calcined products in lumps as it comes from the kiln evenly on floors, and to sprinkle the whole mass carefully with water through a rose-jet, in which condition the mass is left from eight to twelve days, when the slaked portion of the mass is separated from the lumpy particles. The latter are then ground in suitable mills and mixed with the slaked portion of the mass, when the product is ready for the market. This process accomplishes the desired object in a measure, and in a shorter period of time than the atmospheric process; but is imperfect, because it does not bring the product in uniform contact with the moisture, whereby some of the free lime is excessively hydrated while other portions of the free lime are not sufficiently hydrated, or escape the hydrating action altogether. It has also been proposed to expose the calcined product in a layer to the action of water in a finely-divided condition—such as steam or vapor—and although this mode of applying the moisture is desirable, it fails to accomplish the desired end perfectly, because it does not expose all parts of the material uniformly to the action of the moisture, and it is further objectionable, as it requires large compartments for spreading the material and holding the steam or vapor.

My invention relates to an improvement in this last-mentioned process of hydration, consisting in exposing the material to water in a finely-divided state—such as steam or vapor—and has for its object to overcome the aforesaid difficulties existing in said process.

To that end my invention consists in exposing the pulverized or ground calcined material while under agitation or motion to steam, whereby all parts of the pulverized material are uniformly exposed to the moisture, and such particles as are capable of absorbing moisture are uniformly hydrated.

The accompanying drawing represents a plant of machinery by which my improved process can be practiced.

A represents a pulverizing-mill of any suitable or well-known construction, which receives the calcined material from the kiln by a spout, a, and which reduces or pulverizes the material to the proper degree of fineness. The mill preferably employed for this purpose consists of a revolving pan provided with a suitable annular screen or sifter, and rollers revolving on the pan.

B represents a rolling or other suitable screen, which receives the pulverized material from the mill A by an elevator, C, and which separates the coarse particles from the finely-pulverized particles, the latter passing through the meshes of the screen, while the coarse particles tail off, and are returned by conveyers D E to spout a and mill A, in which latter they are reground.

F represents a hydrating chest or chamber, which receives the finely-ground material from the screen B, and which is provided with an agitator, G, by which the material is kept in motion while exposed to the moisture. The chamber F is provided with a pipe, f, through which steam is admitted to the chamber. I prefer to employ the exhaust-steam of a steam-engine for this purpose.

As shown in the drawing, the agitator G consists of a screw-conveyer, which is arranged on the bottom of the chamber F, and propels the material from the inlet-opening $h$ at one end of the chamber to the discharge-opening $i$ at the opposite end, and which at the same time rolls or tumbles the material in the chamber F, and brings all parts of the material in contact with the steam or vapor with which the chamber is filled, thereby effecting a complete and uniform hydration of the particles of free lime. Instead of a screw-conveyer a revolving rake or hopper-boy may be used for the purpose of agitating the material in the hydrating-chamber. As the material has been finely pulverized before it is subjected to the action of the moisture the particles of free lime are detached from the rest of the calcined material, and are in a condition in which all parts thereof can be brought into intimate contact with the atmosphere of steam. The steam-inlet pipe $f$ is provided with a suitable stop cock or valve for regulating the quantity of steam which is admitted to the chamber F. The latter may be made so long that the free lime is properly hydrated by passing the material once through the chamber; or, if preferred, the chamber may be made shorter, and the material may be passed repeatedly through the same. The completed product is discharged from the chamber F into barrels K or other suitable receptacles.

I am aware that it has been proposed to hydrate cement by subjecting it in pulverulent condition to the action of a forced current of air charged with moisture, and I do not claim this method, which is essentially different from my invention.

I claim as my invention—

The herein-described process of hydrating hydraulic lime or cement, which consists in exposing the pulverized calcined product while in motion or agitation to the action of an atmosphere of steam, substantially as set forth.

Witness my hand this 30th day of June, 1885.

U. CUMMINGS.

Witnesses:
JNO. J. BONNER,
CARL F. GEYER.